United States Patent
Fremrot et al.

(10) Patent No.: US 11,823,810 B2
(45) Date of Patent: Nov. 21, 2023

(54) TWISTED-PAIR CABLE SERIAL CONSOLE COMMUNICATION ADAPTER SYSTEM

(71) Applicant: Dell Products L.P., Round Rock, TX (US)

(72) Inventors: Per Henrik Fremrot, Novato, CA (US); Shree Rathinasamy, Round Rock, TX (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/683,008

(22) Filed: Feb. 28, 2022

(65) Prior Publication Data

US 2023/0274857 A1   Aug. 31, 2023

(51) Int. Cl.
*H01B 11/02*   (2006.01)
*H01R 31/06*   (2006.01)
*G06F 13/38*   (2006.01)

(52) U.S. Cl.
CPC .......... *H01B 11/02* (2013.01); *G06F 13/385* (2013.01); *H01R 31/06* (2013.01)

(58) Field of Classification Search
CPC ....................................................... H04L 67/12
See application file for complete search history.

(56) References Cited

U.S. PATENT DOCUMENTS

| | | | | |
|---|---|---|---|---|
| 6,554,650 B2 * | 4/2003 | Kayworth | .............. | H01R 31/06 |
| | | | | 439/639 |
| 8,295,163 B1 * | 10/2012 | Schmalz | ................. | H04L 43/16 |
| | | | | 370/242 |
| 8,923,326 B2 * | 12/2014 | Tang | ..................... | G06F 3/1423 |
| | | | | 348/441 |

* cited by examiner

Primary Examiner — Henry Tsai
Assistant Examiner — Juanito C Borromeo
(74) Attorney, Agent, or Firm — Joseph Mencher

(57) ABSTRACT

A twisted-pair cable serial console communication adapter system includes a networking device including a first serial console connector, a twisted-pair cable including a first twisted-pair cable connector, and a first twisted-pair cable serial console communication adapter device that is connected to the first serial console connector and the first twisted-pair cable connector. The first twisted-pair cable serial console communication adapter device receives first signals via a first transmit pin on the first serial console connector, and provides the first signals to a first twisted-pair conductor in the twisted-pair cable. The first twisted-pair cable serial console communication adapter device also receives second signals via a second twisted-pair conductor in the twisted-pair cable, and provides the second signals to a first receive pin on the first serial console connector.

20 Claims, 14 Drawing Sheets

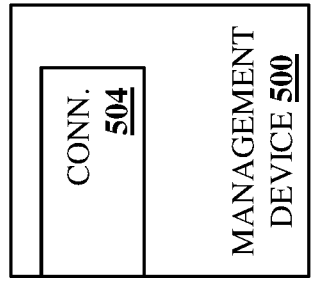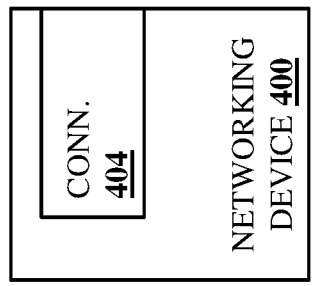
FIG. 8A

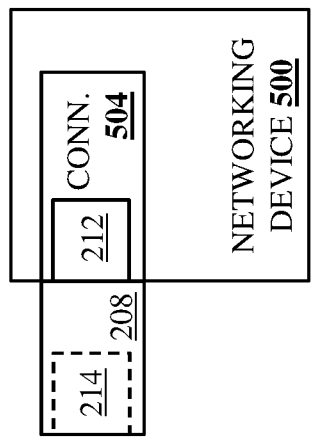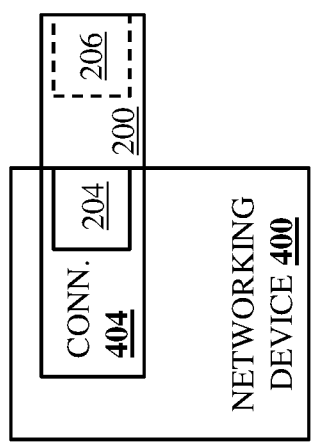
FIG. 8B

TWISTED-PAIR CABLE SERIAL CONSOLE COMMUNICATION ADAPTER SYSTEM

BACKGROUND

The present disclosure relates generally to information handling systems, and more particularly to an adapter system for allowing the use of a twisted-pair cable with de-facto industry-standard RJ-45 connectors to perform serial console communications between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, switch devices and other networking devices known in the art, include serial console RJ-45 connectors for performing serial console communications with a management device such as a laptop/notebook computing device. As will be appreciated by one of skill in the art in possession of the present disclosure, serial console RJ-45 connectors that are configured to allow serial console communications may include 8 pins: a Request To Send (RTS) pin, a Clear To Send (CTS) pin, a transmit (TxD) pin, a receive (RxD) pin, two ground (GND) pins, and two No Connect (NC) pins. Furthermore, conventional serial console cables (also called "Yost" cables, "CISCO® (Serial Console)" cables, or "rollover console" cables) include "flat" cabling having corresponding parallel conductors for the 8 pins discussed above, as well as a RJ-45 male connector on a first end of the "flat" cabling that is configured to connect to the serial console RJ-45 female connector on the switch device, and a connector on a second end of the "flat" cabling that is configured to connect to a connector on the management device (e.g., a RJ-45 male connector may be provided on the second end of the "flat" cabling to connect to a serial console RJ-45 female connector on the management device that is used for serial console communications, a DB9 connector may be provided on the second end of the "flat" cabling and used with a DB9-to-RJ45 adapter to connect to a serial console RJ-45 female connector on the management device that is used for serial console communications, etc.). However, conventional serial console cables raise a number of issues, as they are specialized cables that are not always available in a datacenter, and typically include relatively short lengths that require the management device to be located relatively close to the switch device.

One solution to the issues discussed above is to utilize conventional twisted-pair Ethernet cables that are commonly available in datacenters and often pre-run throughout the datacenter. However, one of skill in the art in possession of the present disclosure will appreciate that while the conventional serial console cables discussed above utilize RJ-45 connectors that are also utilized on conventional twisted-pair Ethernet cables, those conventional serial console cables do not utilize conventional twisted-pair Ethernet cabling (rather, they utilize the 8-conductor "flat" cabling discussed above). Furthermore, the conventional use of a conventional twisted-pair Ethernet cable with the serial console RJ-45 connector on the switch device involves the use of a "rollover" adapter on one end of the conventional twisted-pair Ethernet cable that routes the signals sent between the 8 pins of the serial console RJ-45 connector on the switch device and the corresponding 8 pins of the serial console RJ-45 connector on the management device (e.g., by routing the signals from the RTS pin of the serial console RJ-45 connector on the switch device to the CTS pin of the serial console RJ-45 connector on the management device, routing the signals from the TxD pin of the serial console RJ-45 connector on the switch device to the RxD pin of the serial console RJ-45 connector on the management device, routing the signals from the RTS pin of the serial console RJ-45 connector on the management device to the CTS pin of the serial console RJ-45 connector on the switch device, and routing the signals from the TxD pin of the serial console RJ-45 connector on the management device to the RxD pin of the serial console RJ-45 connector on the switch device). However, the use of conventional "rollover" adapters raises some issues as well.

For example, the connection of a conventional twisted-pair Ethernet cable to a serial console RJ-45 connector on the switch device will result in the TxD pin and the RxD pin in that serial console RJ-45 connector transmitting/receiving signals via the same twisted pair in the Ethernet cabling. As will be appreciated by one of skill in the art in possession of the present disclosure, the routing of such signals in opposite directions on the same twisted pair in Ethernet cabling can result in "near-end cross-talk" interference that can, for example, cause a "pulse", "glitch", "echo", or other interference at the receiver for each edge on the transmitter. As such, the conventional use of a conventional twisted-pair Ethernet cable with the serial console RJ-45 connector on the switch device is generally limited to relatively short distances, and thus cannot take advantage of relatively long, pre-run Ethernet cables that exist in most datacenters. Solutions to these issues include utilizing a device that operates to strengthen serial console signals and/or convert the serial console signals to differential signals in order to increase the distance they may be transmitted, but such solutions require costly, active devices with their own power source.

Accordingly, it would be desirable to provide a twisted-pair cable serial console communication system that addresses the issues discussed above.

SUMMARY

According to one embodiment, a twisted-pair cable serial console communication adapter device, comprising: a chassis; a serial console connector that is included on the chassis; a twisted-pair connector that is included on the chassis and that is configured to connect to a twisted-pair cable; and a signal routing subsystem that is coupled the serial console connector and the twisted-pair connector, wherein the signal routing subsystem is configured to: receive first signals via a transmit pin on the serial console connector; provide the first signals to a first twisted-pair conductor connector pin in the twisted-pair connector that is configured to connect to a first twisted-pair conductor in the twisted-pair cable when the twisted pair cable is connected to the twisted-pair connector; receive second signals via a second twisted-pair conductor connector pin in the twisted pair connector that is configured to connect to a second twisted-pair conductor in the twisted-pair cable when the twisted pair cable is connected to the twisted-pair connector; and provide the second signals to a receive pin on the serial console connector.

BRIEF DESCRIPTION OF THE DRAWINGS

FIG. 8A is a schematic view illustrating an embodiment of the networking device of FIG. 4 and the management device of FIG. 5 during the method of FIG. 6.

FIG. 8B is a schematic view illustrating an embodiment of the first twisted-pair cable serial console communication adapter device of FIG. 2A and the second twisted-pair cable serial console communication adapter device of FIG. 2B connected to the networking device and the management device of FIG. 8A during the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
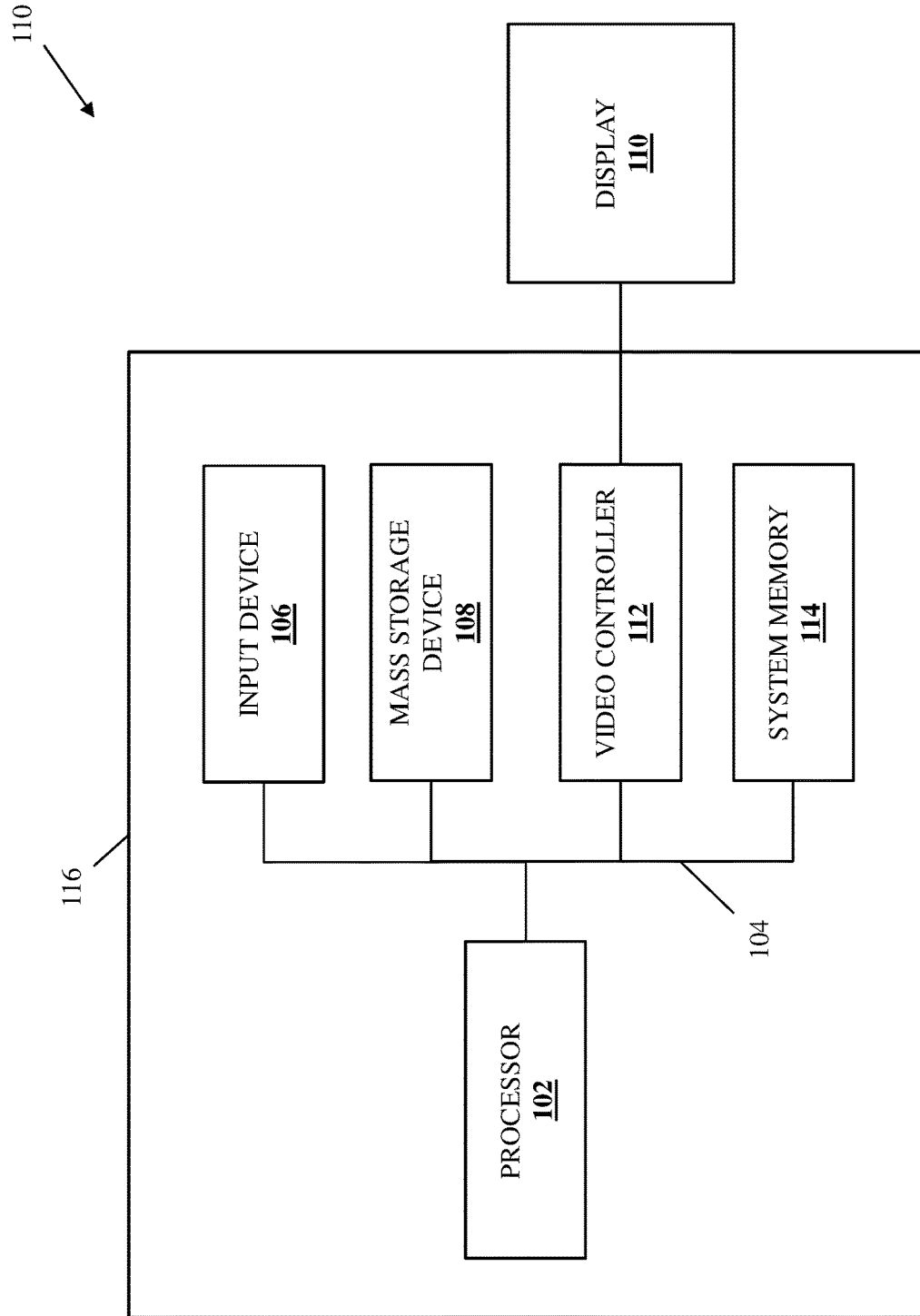
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
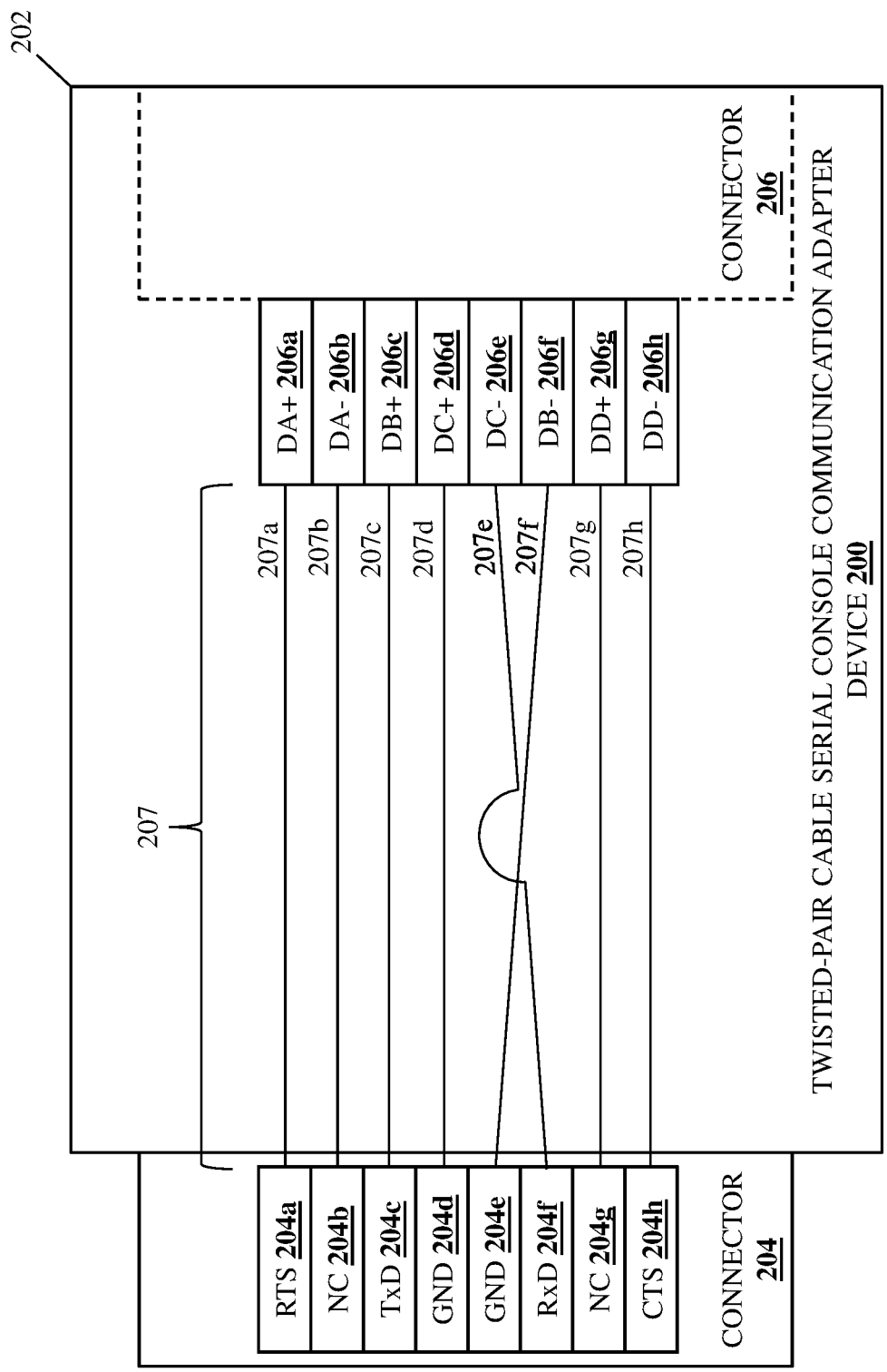
FIG. 2A is a schematic view illustrating an embodiment of a first twisted-pair cable serial console communication adapter device.

Referring now to FIG. 2A, an embodiment of a twisted-pair cable serial console communication adapter device 200 is illustrated. In the illustrated embodiment, the twisted-pair cable serial console communication adapter device 200 includes a chassis 202 that houses the components of the twisted-pair cable serial console communication adapter device 200, only some of which are illustrated in FIG. 2A. For example, the chassis 202 may include an adapter serial console connector 204 that, in the illustrated embodiment, includes serial console pins such as the Request To Send (RTS) pin 204a, No Connect (NC) pin 204b, transmit (TxD) pin 204c, ground (GND) pin 204d, GND pin 204e, receive (RxD) pin 204f, NC pin 204g, and Clear To Send (CTS) pin 204h illustrated in FIG. 2A. In a specific example, the adapter serial console connector 204 may be provided by an adapter serial console RJ-45 male connector, although one of skill in the art in possession of the present disclosure will appreciate how other serial console connectors may fall within the scope of the present disclosure as well.

The chassis 202 may also include an adapter twisted-pair connector 206 that, in the illustrated embodiment, includes twisted-pair pins such as the DA+ pin 206*a*, DA− pin 206*b*, DB+ pin 206*c*, DC+ pin 206*d*, DC− pin 206*e*, DB− pin 206*f*, DD+ pin 206*g*, and DD− pin 206*h* illustrated in FIG. 2A. In a specific example, the adapter twisted-pair connector 206 may be provided by an adapter Ethernet RJ-45 female connector, although one of skill in the art in possession of the present disclosure will appreciate how other twisted-pair connectors may fall within the scope of the present disclosure as well. As will be appreciated by one of skill in the art in possession of the present disclosure and as discussed in further detail below, the adapter twisted-pair connector 206 may be configured to connect to a twisted-pair cable such as an Ethernet cable, with the DA+ pin 206*a* and DA− pin 206*b* coupling to a first twisted pair conductor in the twisted-pair cable, the DB+ pin 206*c* and DB− pin 206*f* coupling to a second twisted pair conductor in the twisted-pair cable, the DC+ pin 206*d* and DC− pin 206*e* coupling to a third twisted pair conductor in the twisted-pair cable, and the DD+ pin 206*g* and DD− pin 206*h* coupling to a fourth twisted pair conductor in the twisted-pair cable.

The chassis 202 may also include a signal routing subsystem 207 having a coupling 207*a* that connects the DA+ pin 207*a* to the RTS pin 204*a*, a coupling 207*b* that connects the DA− pin 206*b* to the NC pin 204*b*, a coupling 207*c* that connects the DB+ pin 206*c* to the TxD pin 204*c*, a coupling 207*d* that connects the DC+ pin 206*d* to the GND pin 204*d*, a coupling 207*e* that connects the DC− pin 206*e* to the RxD pin 204*f*, a coupling 207*f* that connects the DB− pin 206*f* to the GND pin 204*e*, a coupling 207*g* that connects the DD+ pin 206*g* to the NC pin 204*g*, and a coupling 207*h* that connects the DD− pin 206*h* to the CTS pin 204*h*. As discussed in further detail below and as will be appreciated by one of skill in the art in possession of the present disclosure, the signal routing subsystem 207 operates to switch the coupling of a GND pin on a serial console RJ-45 connector (which would otherwise couple to a DC− pin on an Ethernet RJ-45 connector) and an RxD pin on that serial console RJ-45 connector (which would otherwise couple to a DB− pin on the Ethernet RJ-45 connector) such that the GND pin is instead coupled to the DB− pin on the Ethernet RJ-45 connector and the RxD pin is instead coupled to the DC− pin on the Ethernet RJ-45 connector.

However, one of skill in the art in possession of the present disclosure will appreciate how other configurations of the signal routing subsystem 207 may provide the functionality described below as well. For example, the signal routing subsystem 207 may instead switch the coupling of a GND pin on a serial console RJ-45 connector (which would otherwise couple to a DC+ pin on an Ethernet RJ-45 connector) and an TxD pin on that serial console RJ-45 connector (which would otherwise couple to a DB+ pin on the Ethernet RJ-45 connector) such that the GND pin is instead coupled to the DB+ pin on the Ethernet RJ-45 connector and the TxD pin is instead coupled to the DC+ pin on the Ethernet RJ-45 connector. In other words, rather than as illustrated in FIG. 2A, the signal routing subsystem 207 may instead provide a coupling that connects the DB+ pin 206*c* to the GND pin 204*d*, and a coupling that connects the DC+ pin 206*d* to the TxD pin 204*c* (along with a coupling that connects the DC− pin 206*e* to the GND pin 204*e*, a coupling that connects the DB− pin 206*f* to the RxD pin 204*f*, and with the remaining couplings in illustrated in FIG. 2A remaining the same). As such, while a specific twisted-pair cable serial console communication adapter device 200 has been illustrated and described, one of skill in the art in possession of the present disclosure will recognize that the twisted-pair cable serial console communication adapter device 200 of the present disclosure may include a variety of other components and component configurations while remaining within the scope of the present disclosure as well.

Figure 2B:
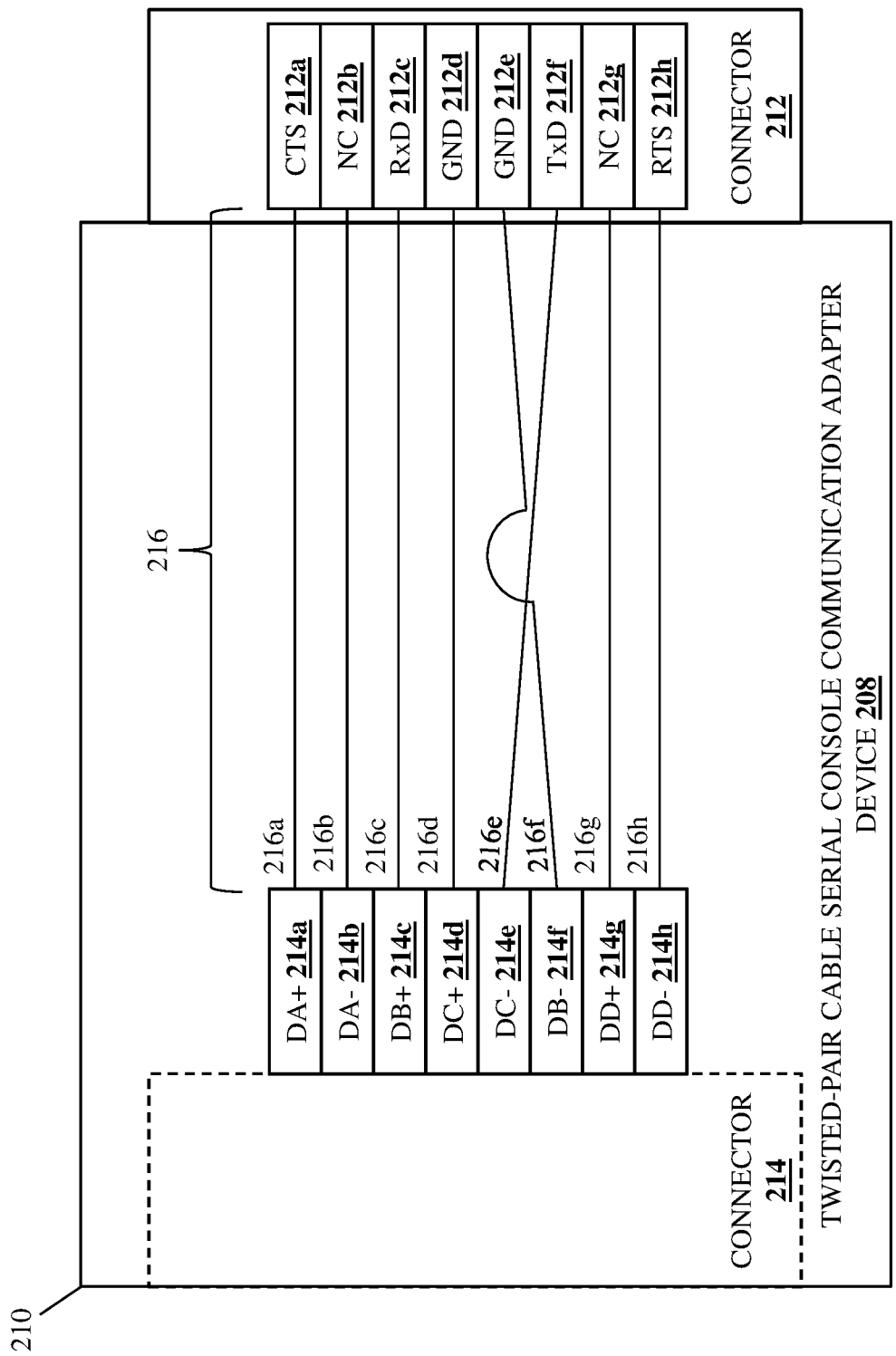
FIG. 2B is a schematic view illustrating an embodiment of a second twisted-pair cable serial console communication adapter device.

Referring now to FIG. 2B, an embodiment of a twisted-pair cable serial console communication adapter device 208 is illustrated. In the illustrated embodiment, the twisted-pair cable serial console communication adapter device 208 includes a chassis 210 that houses the components of the twisted-pair cable serial console communication adapter device 208, only some of which are illustrated in FIG. 2B. For example, the chassis 210 may include an adapter serial console connector 212 that, in the illustrated embodiment, includes serial console pins such as the CTS pin 212*a*, NC pin 212*b*, RxD pin 212*c*, GND pin 212*d*, GND pin 212*e*, TxD pin 212*f*, NC pin 212*g*, and RTS pin 212*h* illustrated in FIG. 2B. In a specific example, the adapter serial console connector 212 may be provided by an adapter serial console RJ-45 male connector, although one of skill in the art in possession of the present disclosure will appreciate how other serial console connectors may fall within the scope of the present disclosure as well.

The chassis 210 may also include an adapter twisted-pair connector 214 that, in the illustrated embodiment, includes twisted-pair pins such as the DA+ pin 214*a*, DA− pin 214*b*, DB+ pin 214*c*, DC+ pin 214*d*, DC− pin 214*e*, DB− pin 214*f*, DD+ pin 214*g*, and DD− pin 214*h* illustrated in FIG. 2B. In a specific example, the adapter twisted-pair connector 214 may be provided by an adapter Ethernet RJ-45 female connector, although one of skill in the art in possession of the present disclosure will appreciate how other twisted-pair connectors may fall within the scope of the present disclosure as well. As will be appreciated by one of skill in the art in possession of the present disclosure and as discussed in further detail below, the adapter twisted-pair connector 214 may be configured to connect to a twisted-pair cable such as an Ethernet cable, with the DA+ pin 214*a* and DA− pin 214*b* coupling to a first twisted pair conductor in the twisted-pair cable, the DB+ pin 214*c* and DB− pin 214*f* coupling to a second twisted pair conductor in the twisted-pair cable, the DC+ pin 214*d* and DC− pin 214*e* coupling to a third twisted pair conductor in the twisted-pair cable, and the DD+ pin 214*g* and DD− pin 214*h* coupling to a fourth twisted pair conductor in the twisted-pair cable.

The chassis 210 may also include a signal routing subsystem 216 having a coupling 216*a* that connects the DA+ pin 214*a* to the CTS pin 212*a*, a coupling 216*b* that connects the DA− pin 214*b* to the NC pin 212*b*, a coupling 216*c* that connects the DB+ pin 214*c* to the RxD pin 212*c*, a coupling 216*d* that connects the DC+ pin 214*d* to the GND pin 212*d*, a coupling 216*e* that connects the DC− pin 214*e* to the TxD pin 212*f*, a coupling 216*f* that connects the DB− pin 214*f* to the GND pin 212*e*, a coupling 216*g* that connects the DD+ pin 214*g* to the NC pin 212*g*, and a coupling 216*h* that connects the DD− pin 214*h* to the RTS pin 212*h*. As discussed in further detail below and as will be appreciated by one of skill in the art in possession of the present disclosure, the signal routing subsystem 216 operates to switch the coupling of a GND pin on a serial console RJ-45 connector (which would otherwise couple to a DC− pin on an Ethernet RJ-45 connector) and an TxD pin on that serial console RJ-45 connector (which would otherwise couple to a DB− pin on the Ethernet RJ-45 connector) such that the GND pin is instead coupled to the DB− pin on the Ethernet RJ-45 connector and the TxD pin is instead coupled to the DC− pin on the Ethernet RJ-45 connector.

However, one of skill in the art in possession of the present disclosure will appreciate how other configurations of the signal routing subsystem 216 may provide the functionality described below as well. For example, the signal routing subsystem 216 may instead switch the coupling of a GND pin on a serial console RJ-45 connector (which would otherwise couple to a DC+ pin on an Ethernet RJ-45 connector) and an RxD pin on that serial console RJ-45 connector (which would otherwise couple to a DB+ pin on the Ethernet RJ-45 connector) such that the GND pin is instead coupled to the DB+ pin on the Ethernet RJ-45 connector and the RxD pin is instead coupled to the DC+ pin on the Ethernet RJ-45 connector. In other words, rather than as illustrated in FIG. 2B, the signal routing subsystem 216 may instead provide a coupling that connects the DB+ pin 214c to the GND pin 212d, and a coupling that connects the DC+ pin 214d to the RxD pin 212c (along with a coupling that connects the DC− pin 214e to the GND pin 212e, a coupling that connects the DB− pin 214f to the TxD pin 212f, and with the remaining couplings in illustrated in FIG. 2B remaining the same). As such, while a specific twisted-pair cable serial console communication adapter device 208 has been illustrated and described, one of skill in the art in possession of the present disclosure will recognize that the twisted-pair cable serial console communication adapter device 208 of the present disclosure may include a variety of other components and component configurations while remaining within the scope of the present disclosure as well.

Figure 3:
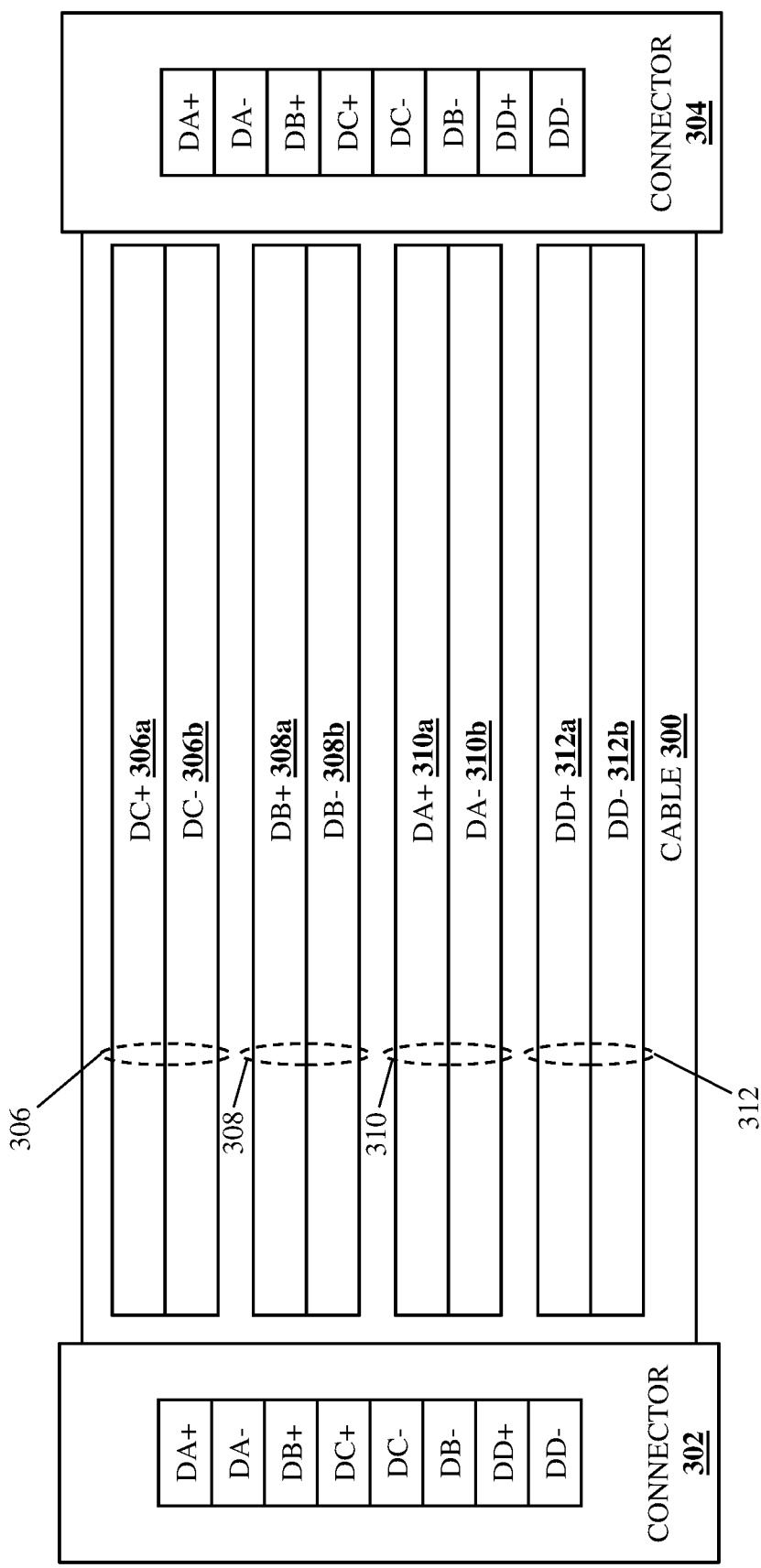
FIG. 3 is a schematic view illustrating an embodiment of a twisted-pair cable.

Referring now to FIG. 3, an embodiment of a twisted-pair cable 300 is illustrated that may be provided by an Ethernet cable or other twisted-pair cables that would be apparent to one of skill in the art in possession of the present disclosure. In the illustrated embodiment, the twisted-pair cable 300 includes a cable twisted-pair connector 302 that may be provided by a cable Ethernet RJ-45 male connector or other twisted-pair connectors that would be apparent to one of skill in the art in possession of the present disclosure. As illustrated, the cable twisted-pair connector 302 includes the DA+ pin, DA− pin, DB+ pin, DC+ pin, DC− pin, DB− pin, DD+ pin, and DD− pin illustrated in FIG. 3. The twisted-pair cable 300 also includes a cable twisted-pair connector 304 that may be provided by a cable Ethernet RJ-45 male connector or other twisted-pair connectors that would be apparent to one of skill in the art in possession of the present disclosure. As illustrated, the cable twisted-pair connector 304 includes the DA+ pin, DA− pin, DB+ pin, DC+ pin, DC− pin, DB− pin, DD+ pin, and DD− pin illustrated in FIG. 3.

As illustrated, the twisted-pair cable 300 includes a first twisted-pair conductor 306 that provides a DC+ conduit 306a between the DC+ pins in the cable twisted-pair connectors 302 and 304, as well as a DC− conduit 306b between the DC− pins in the cable twisted-pair connectors 302 and 304. The twisted-pair cable 300 also includes a second twisted-pair conductor 308 that provides a DB+ conduit 308a between the DB+ pins in the cable twisted-pair connectors 302 and 304, as well as a DB− conduit 308b between the DB− pins in the cable twisted-pair connectors 302 and 304. The twisted-pair cable 300 also includes a third twisted-pair conductor 310 that provides a DA+ conduit 310a between the DA+ pins in the cable twisted-pair connectors 302 and 304, as well as a DA− conduit 310b between the DA− pins in the cable twisted-pair connectors 302 and 304. The twisted-pair cable 300 also includes a fourth twisted-pair conductor 312 that provides a DD+ conduit 312a between the DD+ pins in the cable twisted-pair connectors 302 and 304, as well as a DD− conduit 312b between the DD− pins in the cable twisted-pair connectors 302 and 304. However, while a specific twisted-pair cable has been illustrated and described, one of skill in the art in possession of the present disclosure will recognize that the twisted-pair cable utilized in the present disclosure may include a variety of other components and component configurations while remaining within the scope of the present disclosure as well.

Figure 4:
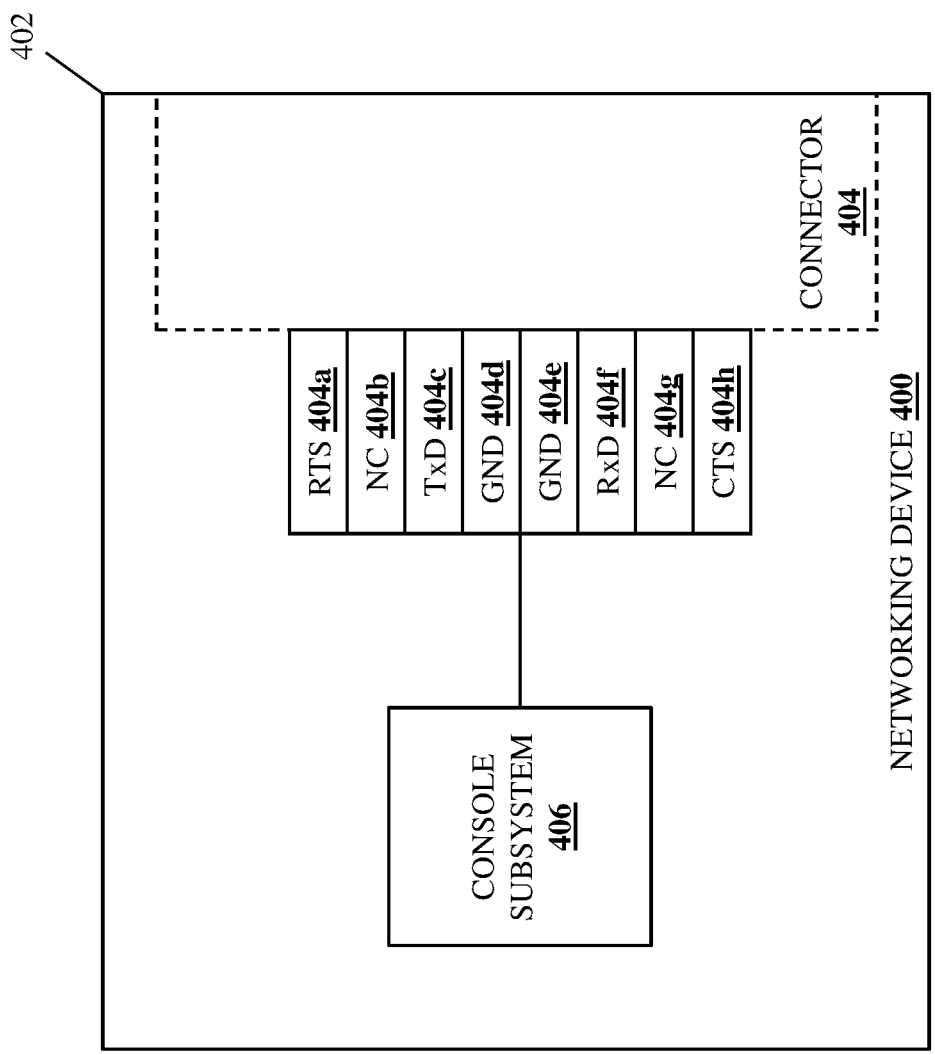
FIG. 4 is a schematic view illustrating an embodiment of a networking device.

Referring now to FIG. 4, an embodiment of a networking device 400 is illustrated. In an embodiment, the networking device 400 may be provided by the IHS 100 discussed above with reference to FIG. 1 and/or may include some or all of the components of the IHS 100, and in specific examples may be provided by a switch device or other networking devices that would be apparent to one of skill in the art in possession of the present disclosure. Furthermore, while illustrated and discussed as being provided by a switch device, one of skill in the art in possession of the present disclosure will recognize that the functionality of the networking device 400 discussed below may be provided by other computing devices (servers, storage systems, etc.) that are configured to operate similarly as the networking device 400 discussed below. In the illustrated embodiment, the networking device 400 includes a chassis 402 that houses the components of the networking device 400, only some of which are illustrated and discussed below.

For example, the chassis 402 may include a device serial console connector 404 that, in the illustrated embodiment, includes serial console pins such as the RTS pin 404a, NC pin 404b, TxD pin 404c, GND pin 404d, GND pin 404e, RxD pin 404f, NC pin 404g, and CTS pin 404h illustrated in FIG. 4. In a specific example, the device serial console connector 404 may be provided by a device serial console RJ-45 female connector, although one of skill in the art in possession of the present disclosure will appreciate how other serial console connectors may fall within the scope of the present disclosure as well. The chassis 402 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a console subsystem 406 that is configured to perform the functionality of the console subsystems and/or networking devices discussed below. However, while a specific networking device 400 has been illustrated and described, one of skill in the art in possession of the present disclosure will recognize that networking devices (or other devices operating according to the teachings of the present disclosure in a manner similar to that described below for the networking device 400) may include a variety of components and/or component configurations for providing conventional networking device functionality, as well as the functionality discussed below, while remaining within the scope of the present disclosure as well.

Figure 5:
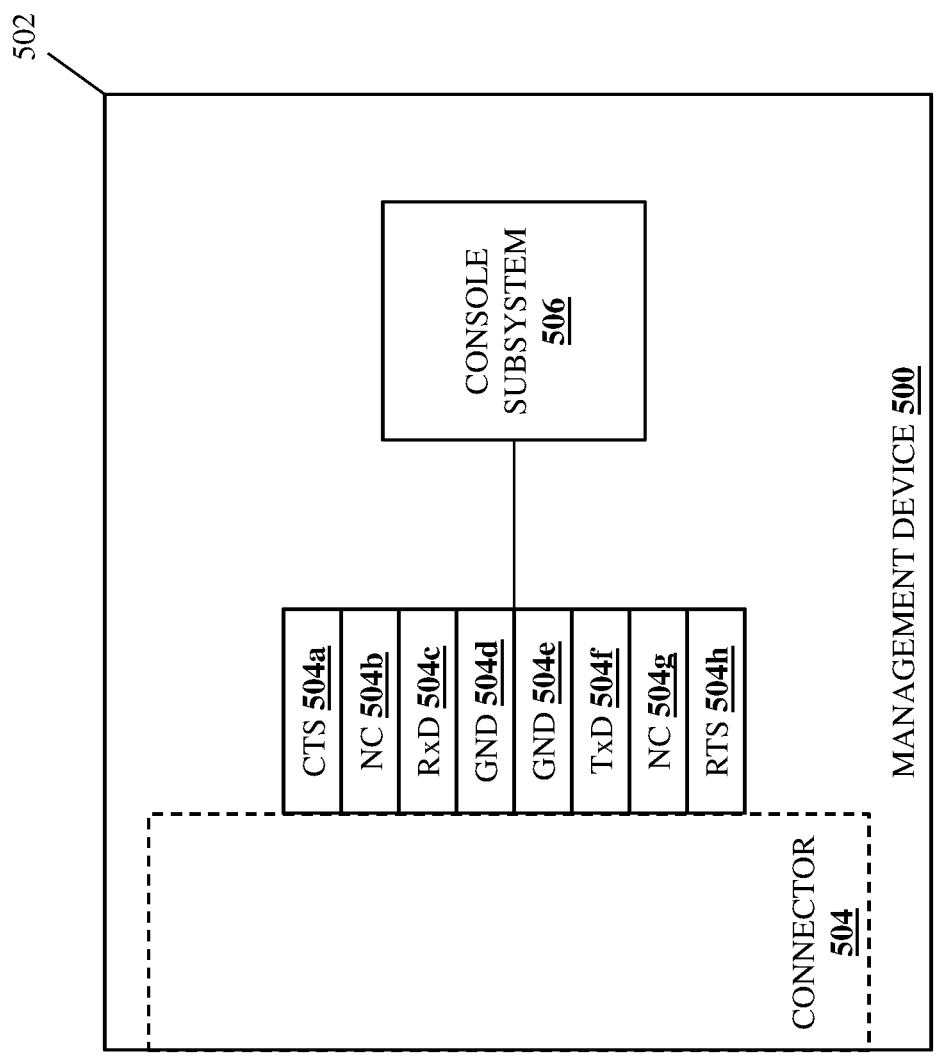
FIG. 5 is a schematic view illustrating an embodiment of a management device.

Referring now to FIG. 5, an embodiment of a management device 500 is illustrated. In an embodiment, the management device 500 may be provided by the IHS 100 discussed above with reference to FIG. 1 and/or may include some or all of the components of the IHS 100, and in specific examples may be provided by a desktop computing device, a laptop/notebook computing device, a tablet computing device, a mobile phone, and/or other management devices that would be apparent to one of skill in the art in possession of the present disclosure. Furthermore, while illustrated and discussed as being provided by particular management devices, one of skill in the art in possession of the present disclosure will recognize that the functionality of the management device 500 discussed below may be provided by other computing devices that are configured to operate similarly as the management device 500 discussed below. In the illustrated embodiment, the management device 500 includes a chassis 502 that houses the components of the management device 500, only some of which are illustrated and discussed below.

For example, the chassis 502 may include a device serial console connector 504 that, in the illustrated embodiment, includes serial console pins such as the CTS pin 504*a*, NC pin 504*b*, RxD pin 504*c*, GND pin 504*d*, GND pin 504*e*, TxD pin 504*f*, NC pin 504*g*, and RTS pin 504*h* illustrated in FIG. 5. In a specific example, the device serial console connector 504 may be provided by a device serial console RJ-45 female connector, although one of skill in the art in possession of the present disclosure will appreciate how other serial console connectors may fall within the scope of the present disclosure as well. The chassis 502 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a console subsystem 506 that is configured to perform the functionality of the console subsystems and/or management devices discussed below. However, while a specific management device 500 has been illustrated and described, one of skill in the art in possession of the present disclosure will recognize that management devices (or other devices operating according to the teachings of the present disclosure in a manner similar to that described below for the management device 500) may include a variety of components and/or component configurations for providing conventional management device functionality, as well as the functionality discussed below, while remaining within the scope of the present disclosure as well.

Figure 6:
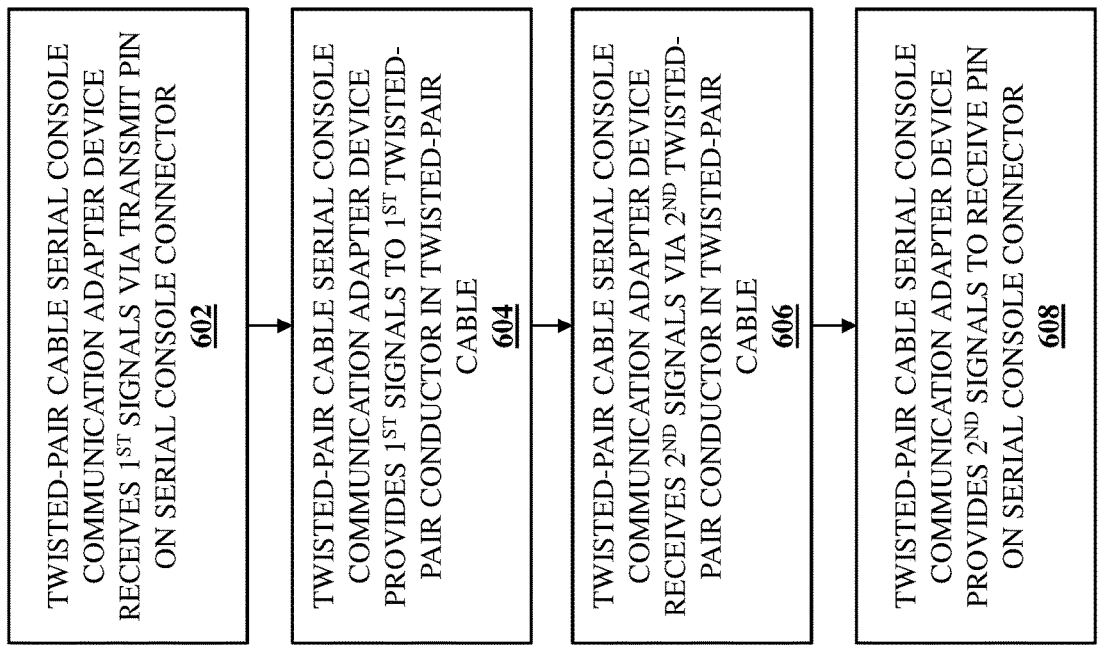
FIG. 6 is a flow chart illustrating an embodiment of a method for providing serial console communications.

Referring now to FIG. 6, an embodiment of a method 600 for providing serial console communications is illustrated. As discussed below, the systems and methods of the present disclosure provide serial communications via a twisted-pair cable while separating transmit signals and receive signals into different twisted-pair conductors in that twisted pair cable. For example, the twisted-pair cable serial console communication adapter system of the present disclosure may include a networking device including a first serial console connector, a twisted-pair cable including a first twisted-pair cable connector, and a first twisted-pair cable serial console communication adapter device that is connected to the first serial console connector and the first twisted-pair cable connector. The first twisted-pair cable serial console communication adapter device receives first signals via a first transmit pin on the first serial console connector, and provides the first signals to a first twisted-pair conductor in the twisted-pair cable. The first twisted-pair cable serial console communication adapter device also receives second signals via a second twisted-pair conductor in the twisted-pair cable, and provides the second signals to a first receive pin on the first serial console connector. As such, serial console communications may be provided via a twisted-pair cable while reducing near-end crosstalk that is introduced when transmit signals and receive signals are provided in the same twisted-pair conductor, thus increasing the distance console communications may be provided via a twisted-pair cable without the need for costly active devices that require separate power sources.

Figure 7:
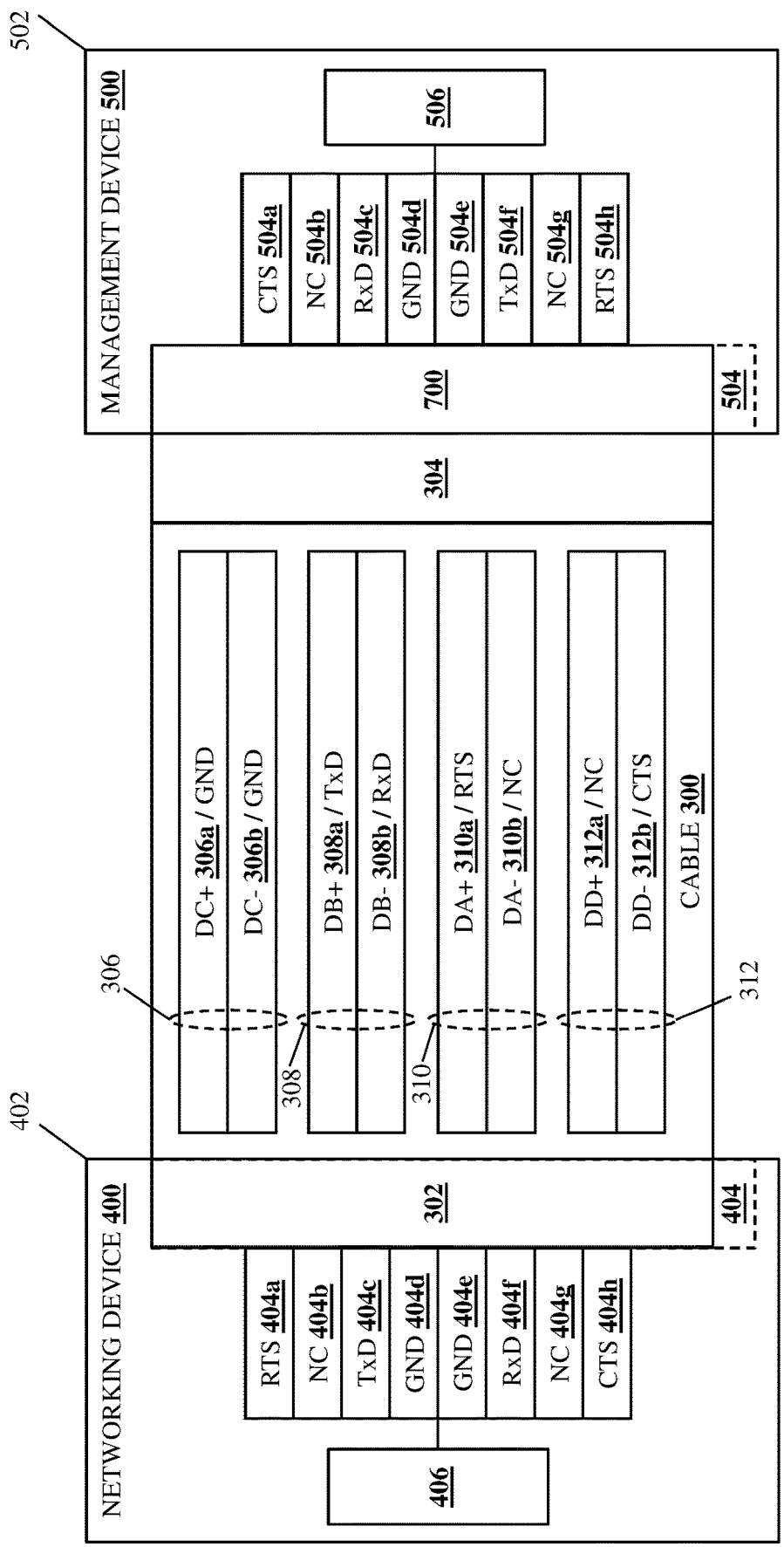
FIG. 7 is a schematic view illustrating an embodiment of the twisted-pair cable of FIG. 3 coupled to each of the networking device of FIG. 4 and the management device of FIG. 5 without the teachings of the present disclosure.

With reference to FIG. 7, an embodiment of the conventional coupling of the device serial console connector 404 on the networking devices 400 and the device serial console connector 504 on the management device 500 using the twisted-pair cable 300 is illustrated to describe some of the issues solved via the teachings of the present disclosure. As illustrated in FIG. 7, the cable twisted-pair connector 302 on the twisted-pair cable 300 may be directly connected to the device serial console connector 404 on the networking devices 400, while the cable twisted-pair connector 304 on the twisted-pair cable 300 may be coupled via a conventional "rollover" adapter 700 to the device serial console connector 504 on the management device 500. While not explicitly illustrated in FIG. 7, one of skill in the art in possession of the present disclosure will appreciate how the RTS pin 404*a*, NC pin 404*b*, TxD pin 404*c*, GND pin 404*d*, GND pin 404*e*, RxD pin 404*f*, NC pin 404*g*, and CTS pin 404*h* on the device serial console connector 404 will engage the DA+ pin, DA− pin, DB+ pin, DC+ pin, DC− pin, DB− pin, DD+ pin, and DD− pin, respectively, on the cable twisted-pair connector 302.

As can be seen in FIG. 7, due to the pin connections provided between the cable twisted-pair connector 302 and the device serial console connector 404, the DC+ conduit 306*a* and the DC− conduit 306*b* in the first twisted-pair conductor 306 are both connected to ground, the DB+ conduit 308*a* in the second twisted-pair conductor 308 transmits TxD signals while the DB− conduit 308*b* in the second twisted-pair conductor 308 transmits RxD signals, the DA+ conduit 310*a* in the third twisted-pair conductor 310 transmits RTS signals while the DA− conduit 310*b* in the third twisted-pair conductor 310*a* is connected to NC pins, and the DD+ conduit 312*a* in the fourth twisted-pair conductor 312 transmits CTS signals while the DD− conduit 312*b* in the fourth twisted-pair conductor 312 is connected to NC pins. One of skill in the art in possession of the present disclosure will appreciate how the discussion of "TxD signals" and "RxD" signals, as well as "RTS signals" and "CTS" signals, is from the perspective of the networking device 400, and may be reversed when considering the perspective of the management device 500.

Thus, the second twisted-pair conductor 308 in the twisted-pair cable 300 will transmit both TxD signals and RxD signals. In other words, the DB+ pin in the cable twisted-pair connector 302 will engage the TxD pin 404*c* on the device serial console connector 404 such that the DB+ conduit 308*a* in the second twisted-pair conductor 308 transmits the TxD signals to the DB+ pin in the cable twisted-pair connector 304 (with the "rollover" adapter 700 providing the TxD signal to the RxD pin 504*c* in the device serial console connector 504). Similarly, the DB− conduit 308*b* in the second twisted-pair conductor 308 transmits RxD signals (which were transmitted by the management device 500 via the TxD pin 504*f* in the device serial console connector 504, the "rollover" adapter 700, and the DB− pin in the cable twisted-pair connector 304) to the DB− pin in the cable twisted-pair connector 302 that engages the RxD pin 404*f* on the device serial console connector 404. As discussed above, the routing of such signals in opposite directions on the same twisted-pair conduit in a twisted-pair cable can result in "near-end cross-talk" interference that can, for example, cause a "pulse", "glitch", "echo", or other interference at the receiver for each edge on the transmitter.

In an embodiment, prior to or during the method 600, the networking device 400 and management device 500 may be coupled together using the first twisted-pair cable serial console communication adapter device 200 discussed above with reference to FIG. 2A, the second twisted-pair cable serial console communication adapter device 208 discussed above with reference to FIG. 2B, and the twisted-pair cable 300 discussed above with reference to FIG. 3. For example, with reference to FIG. 8A, the networking device 400 including the device serial console connector 404 and the management device 500 including the device serial console connector 504 may be provided. Furthermore, with reference to FIG. 8B, the first twisted-pair cable serial console communication adapter device 200 may be coupled to the networking device 400 by connecting the adapter serial console connector 204 to the device serial console connector 404, and the second twisted-pair cable serial console communication adapter device 208 may be coupled to the management device 500 by connecting the adapter serial console connector 212 to the device serial console connector 504.

Figure 8C:
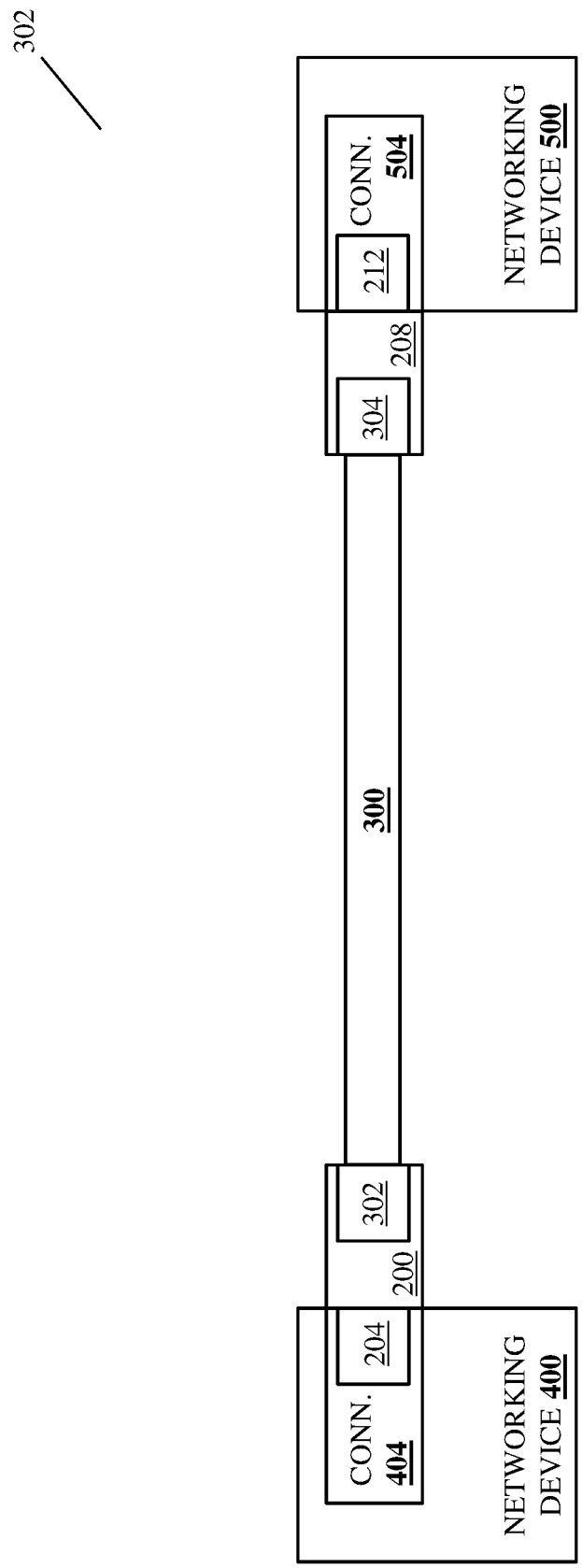
FIG. 8C is a schematic view illustrating an embodiment of the twisted-pair cable of FIG. 3 connected to the first and second twisted-pair cable serial console communication adapter devices of FIG. 8B during the method of FIG. 6.
Figure 8D:
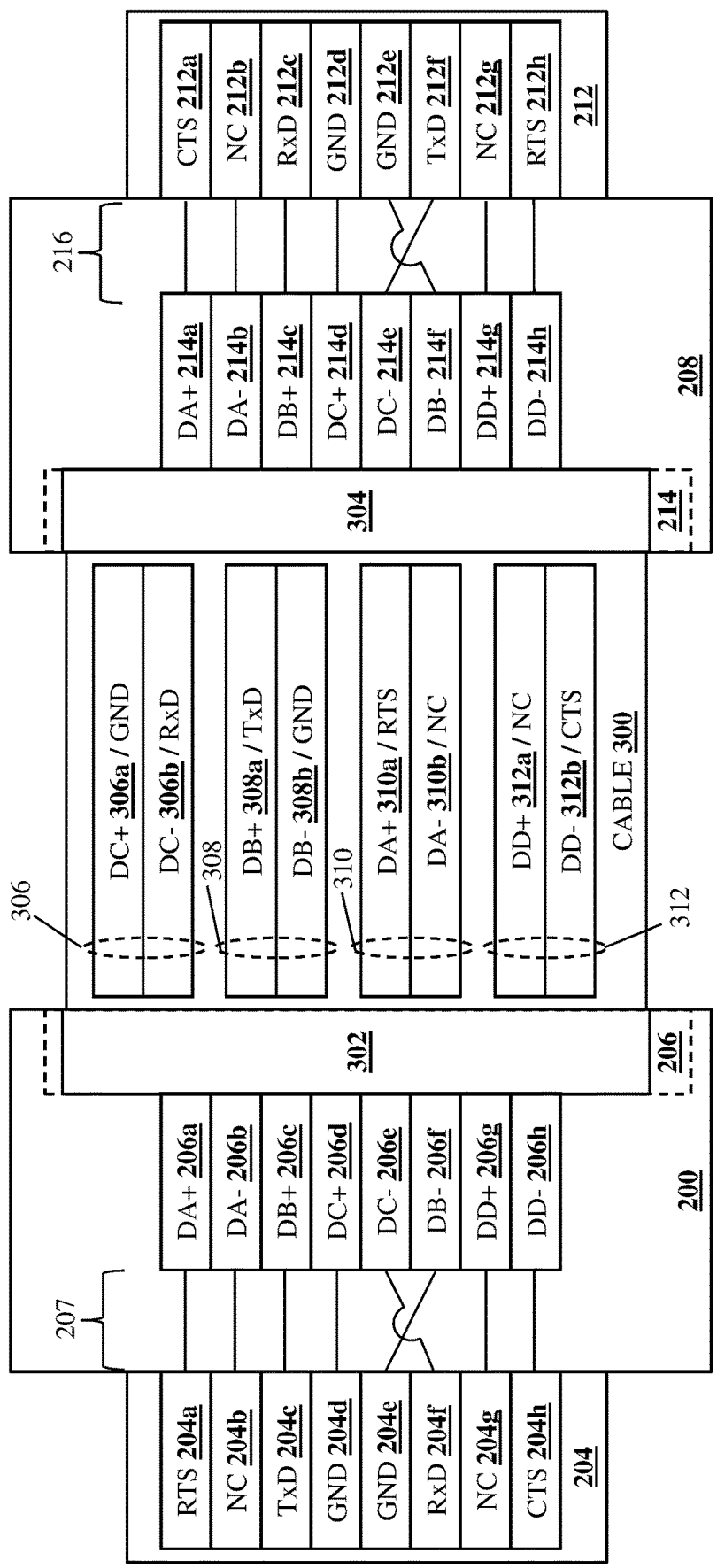
FIG. 8D is a schematic view illustrating an embodiment of the twisted-pair cable connected to the first and second twisted-pair cable serial console communication adapter devices of FIG. 8C during the method of FIG. 6.

Further still, with reference to FIGS. 8C and 8D, the twisted-pair cable 300 may be coupled to each of the first twisted-pair cable serial console communication adapter device 200 and the second twisted-pair cable serial console communication adapter device 208 by engaging the cable twisted-pair connector 302 with the adapter twisted-pair connector 206, and engaging the cable twisted-pair connector 304 with the adapter twisted-pair connector 214. While the networking device 400 is not explicitly illustrated in FIG. 8D, one of skill in the art in possession of the present disclosure will appreciate how the RTS pin 404a, NC pin 404b, TxD pin 404c, GND pin 404d, GND pin 404e, RxD pin 404f, NC pin 404g, and CTS pin 404h on the device serial console connector 404 will engage the RTS pin 204a, NC pin 204b, TxD pin 204c, GND pin 204d, GND pin 204e, RxD pin 204f, NC pin 204g, and CTS pin 204h, respectively, on the adapter serial console connector 204. Similarly, while the management device 500 is not explicitly illustrated in FIG. 8D, one of skill in the art in possession of the present disclosure will appreciate how the CTS pin 504a, NC pin 504b, RxD pin 504c, GND pin 504d, GND pin 504e, TxD pin 504f, NC pin 504g, and RTS pin 504h on the device serial console connector 504 will engage the CTS pin 212a, NC pin 212b, RxD pin 212c, GND pin 212d, GND pin 212e, TxD pin 212f, NC pin 212g, and RTS pin 212h, respectively, on the adapter serial console connector 212.

As such, FIG. 8D illustrates how the first twisted-pair cable serial console communication adapter device 200 and the second twisted-pair cable serial console communication adapter device 208 reconfigure how signals are transmitted via the twisted-pair conductors 306 and 308 in the twisted-pair cable 300. For example, rather than connecting the GND pins 404d and 404e in the device serial console connector 404 to the DC+ conduit 306a and the DC− conduit 306b in the first twisted-pair conductor 306 and connecting the TxD and RxD pins 404c and 404f in the device serial console connector 404 to the DB+ conduit 308a and the DB− conduit 308b in the second twisted-pair conductor 308 (as illustrated and discussed above with reference to FIG. 7), the signal routing subsystem 207 in the first twisted-pair cable serial console communication adapter device 200 reconfigures the GND pin 404e in the device serial console connector 404 to connect to the DB− conduit 308b in the second twisted-pair conductor 308, and reconfigures the RxD pin 404f in the device serial console connector 404 to connect to the DC− conduit 308b in the first twisted-pair conductor 306, which as discussed below provides for the transmission of TxD signals and the receiving of RxD signals by the networking device 400 on different twisted-pair conductors in the twisted pair cable 300.

Similarly, rather than connecting the GND pins 504d and 504e in the device serial console connector 504 to the DC+ conduit 306a and the DC− conduit 306b in the first twisted-pair conductor 306 and connecting the RxD and TxD pins 504c and 504f in the device serial console connector 504 to the DB+ conduit 308a and the DB− conduit 308b in the second twisted-pair conductor 308 (as illustrated in FIG. 7), the signal routing subsystem 216 in the second twisted-pair cable serial console communication adapter device 208 reconfigures the GND pin 504e in the device serial console connector 504 to connect to the DB− conduit 308b in the second twisted-pair conductor 308, and reconfigures the TxD pin 504f in the device serial console connector 504 to connect to the DC− conduit 308b in the first twisted-pair conductor 306, which as discussed below provides for the transmission of TxD signals and the receiving of RxD signals by the management device 500 on different twisted-pair conductors in the twisted pair cable 300.

Figure 9:
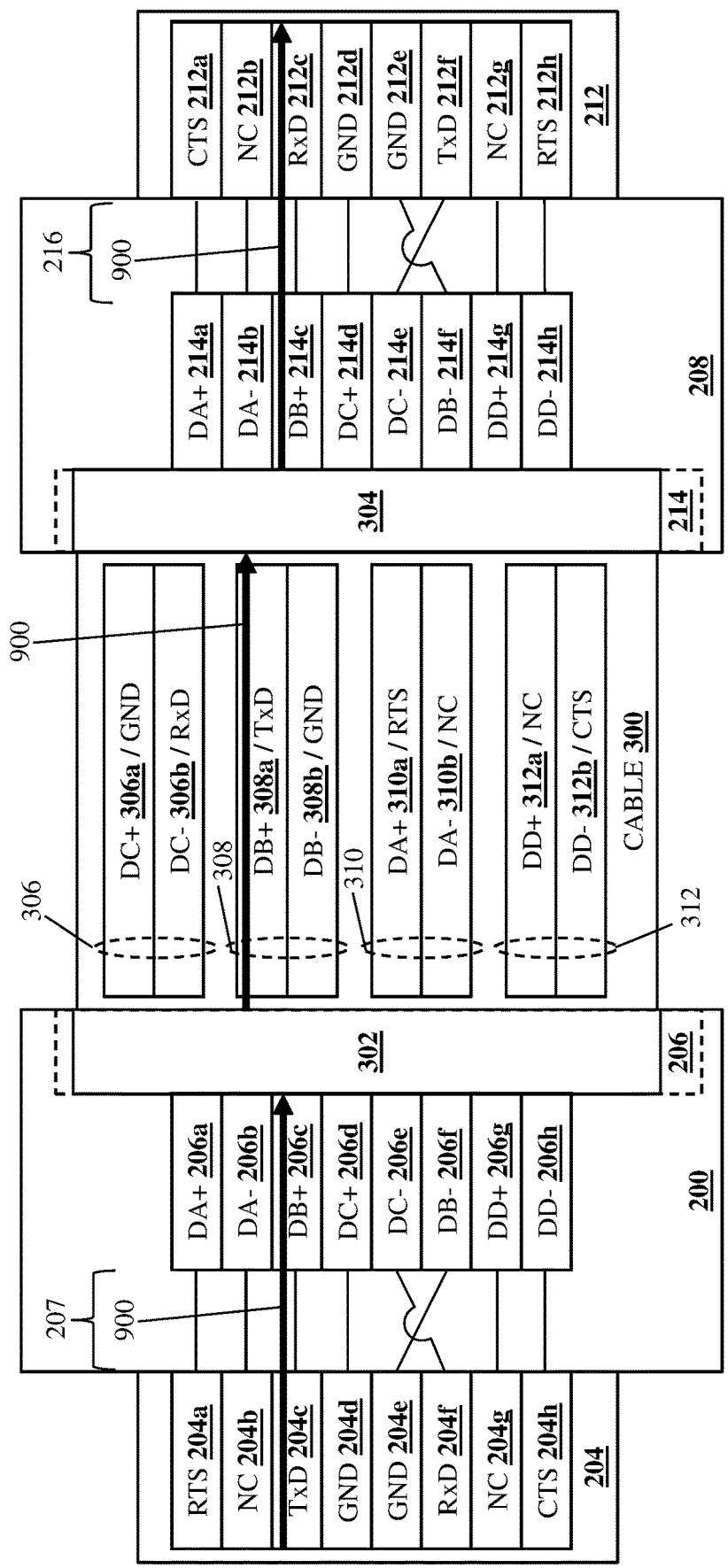
FIG. 9 is a schematic view illustrating an embodiment of the transmission and receiving of signals via the twisted-pair cable connected to the first and second twisted-pair cable serial console communication adapter devices of FIG. 8D during the method of FIG. 6.

As such, the method 600 may begin at block 602 where a twisted-pair cable serial console communication adapter device receives first signals via a transmit pin on a serial console connector. With reference to FIG. 9, in an embodiment of block 602, the console subsystem 406 in the networking device 400 may generate and transmit a signal 900 via the TxD pin 404c on its device serial console connector 404, with that signal received by the first twisted-pair cable serial console communication adapter device 200 at the TxD pin 204c in its adapter serial console connector 204. Similarly, with reference to FIG. 10, in another embodiment of block 602, the console subsystem 506 in the management device 500 may generate and transmit a signal 1000 via the TXd pin 504f on its device serial console connector 504, with that signal received by the second twisted-pair cable serial console communication adapter device 200 at the TxD pin 212f in its adapter serial console connector 212.

The method 600 then proceeds to block 604 where the twisted-pair cable serial console communication adapter device provides the first signals to a first twisted-pair conductor in a twisted-pair cable. With reference back to FIG. 9, in an embodiment of block 604, the signal routing subsystem 207 in the first twisted-pair cable serial console communication adapter device 200 may route the signal 900 received at the TxD pin 204c in the adapter serial console connector 204 via its coupling 207c to the DB+ pin 206c in its adapter twisted-pair connector 206, which causes the signal 900 to be transmitted via the DB+ conduit 308a in the second twisted-pair conductor 308. As discussed above, the DB− conduit 308b in the second twisted-pair conductor 308 is connected to the ground pins 404e and 504e in the device serial console connectors 404 and 504. Similarly, with reference back to FIG. 10 and in another embodiment of block 604, the signal routing subsystem 216 in the second twisted-pair cable serial console communication adapter device 208 may route the signal 1000 received at the TxD pin 212f in the adapter serial console connector 212 via its coupling 216e to the DC− pin 214e in its adapter twisted-pair connector 214, which causes the signal 1000 to be transmitted via the DC− conduit 306b in the first twisted-pair conductor 306. As discussed above, the DC+ conduit 306a in the first twisted-pair conductor 306 is connected to the ground pins 404d and 504d in the device serial console connectors 404 and 504.

The method 600 then proceeds to block 606 where the twisted-pair cable serial console communication adapter device receives second signals via a second twisted-pair conductor in the twisted-pair cable. With reference back to FIG. 10, in an embodiment of block 606, the first twisted-pair cable serial console communication adapter device 200 may receive the signal 1000 transmitted via the DC− conduit 306*b* in the first twisted-pair conductor 306 at the DC− pin 206*e* in its adapter twisted-pair connector 206. Similarly, with reference back to FIG. 9 and in another embodiment of block 606, the second twisted-pair cable serial console communication adapter device 208 may receive the signal 900 transmitted via the DB+ conduit 308*a* in the second twisted-pair conductor 308 at the DB+ pin 214*c* in its adapter twisted-pair connector 214.

The method 600 then proceeds to block 608 where the twisted-pair cable serial console communication adapter device provides the second signals to a receive pin on the serial console connector. With reference back to FIG. 10, in an embodiment of block 608, the signal routing subsystem 207 in the first twisted-pair cable serial console communication adapter device 200 may route the signal 1000 received at the DC− pin 206*e* in its adapter twisted-pair connector 206 via its coupling 207*e* to the RxD pin 204*f* in its adapter serial console connector 204, which causes the signal 1000 to be transmitted via the RxD pin 404*f* in the device serial console connector 404 on the networking device 400 and to the console subsystem 406. Similarly, with reference back to FIG. 9, in another embodiment of block 608, the signal routing subsystem 216 in the second twisted-pair cable serial console communication adapter device 208 may route the signal 900 received at the DB+ pin 214*c* in its adapter twisted-pair connector 214 via its coupling 216*c* to the RxD pin 212*c* in its adapter serial console connector 212, which causes the signal 900 to be transmitted via the RxD pin 504*c* in the device serial console connector 504 on the management device 500 and to the console subsystem 506.

Figure 10:
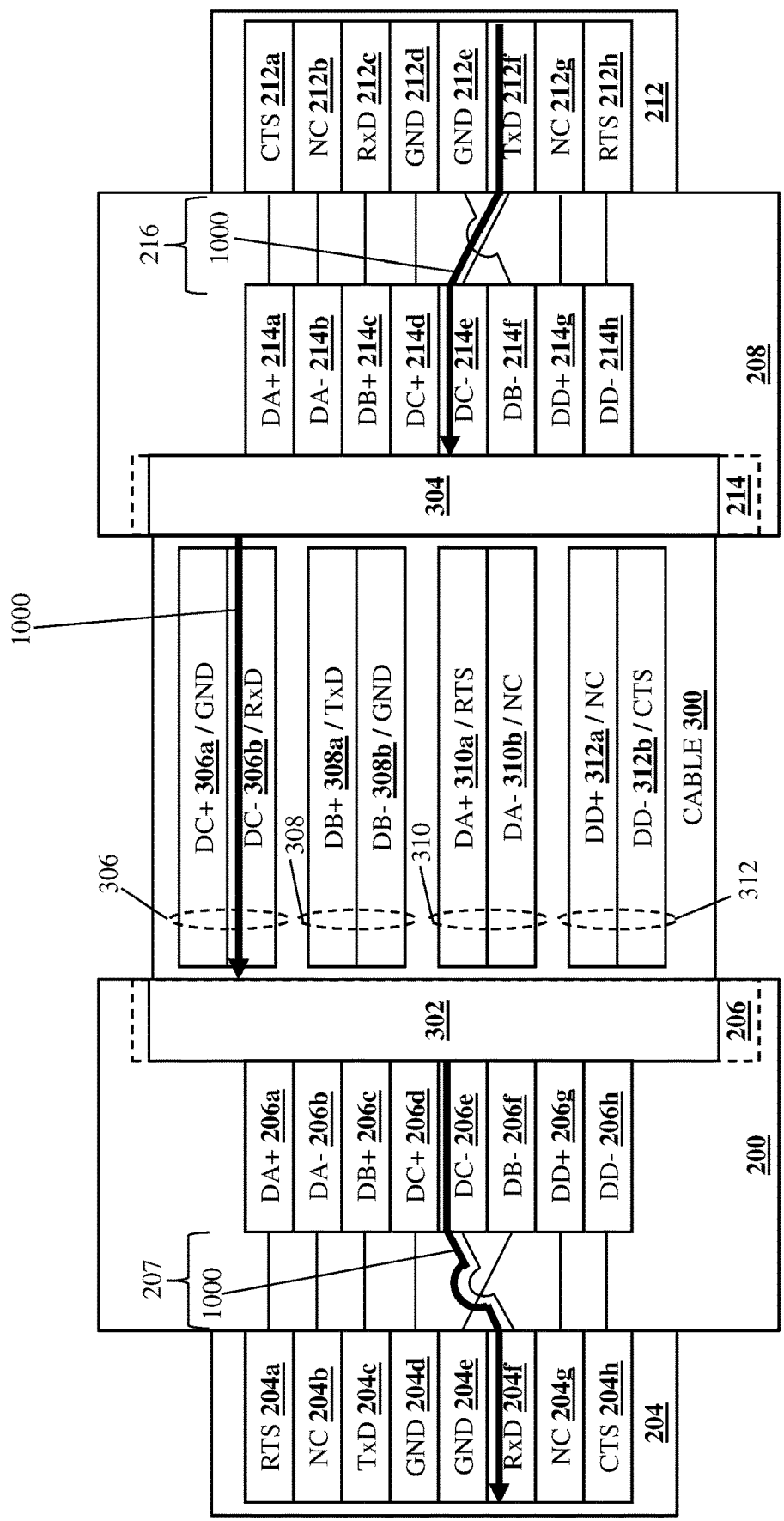
FIG. 10 is a schematic view illustrating an embodiment of the transmission and receiving of signals via the twisted-pair cable connected to the first and second twisted-pair cable serial console communication adapter devices of FIG. 8D during the method of FIG. 6.

As will be appreciated by one of skill in the art in possession of the present disclosure, the separation of the signals transmitted and received by each of the devices into the different twisted-pair conductors in the twisted-pair cable that each also are connected to ground operates to "tightly coupling" those signals to ground, and reduces near-end crosstalk in the serial console communications described with reference to FIGS. 9 and 10, thus increasing the distance at which those signals may be transmitted via twisted-pair cables such as Ethernet cables that are readily available and that may already be routed throughout datacenters.

Thus, systems and methods have been described that provide serial communications via a twisted-pair cable while separating transmit signals and receive signals into different twisted-pair conductors in that twisted pair cable. For example, the twisted-pair cable serial console communication adapter system of the present disclosure may include a networking device including a first serial console connector, a twisted-pair cable including a first twisted-pair cable connector, and a first twisted-pair cable serial console communication adapter device that is connected to the first serial console connector and the first twisted-pair cable connector. The first twisted-pair cable serial console communication adapter device receives first signals via a first transmit pin on the first serial console connector, and provides the first signals to a first twisted-pair conductor in the twisted-pair cable. The first twisted-pair cable serial console communication adapter device also receives second signals via a second twisted-pair conductor in the twisted-pair cable, and provides the second signals to a first receive pin on the first serial console connector. As such, serial console communications may be provided via a twisted-pair cable while reducing near-end crosstalk that is introduced when transmit signals and receive signals are provided in the same twisted-pair conductor, thus increasing the distance console communications may be provided via a twisted-pair cable without the need for costly active devices that require separate power sources Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A twisted-pair cable serial console communication adapter system, comprising:
   a networking device including a first serial console connector;
   a twisted-pair cable including a first twisted-pair cable connector; and
   a first twisted-pair cable serial console communication adapter device that is connected to the first serial console connector and the first twisted-pair cable connector, wherein the first twisted-pair cable serial console communication adapter device is configured to:
      receive first signals via a first transmit pin on the first serial console connector;
      provide the first signals to a first twisted-pair conductor in the twisted-pair cable;
      receive second signals via a second twisted-pair conductor in the twisted-pair cable; and
      provide the second signals to a first receive pin on the first serial console connector.

2. The system of claim 1, wherein the twisted-pair cable is an Ethernet cable and the first twisted-pair cable connector is a cable Ethernet RJ-45 connector.

3. The system of claim 2, wherein the first twisted-pair cable serial console communication adapter device includes an adapter serial console RJ-45 connector connected to the first serial console connector, and an adapter Ethernet RJ-45 connector connected to the cable Ethernet RJ-45 connector provided by the first twisted-pair cable connector.

4. The system of claim 1, wherein the first twisted-pair conductor in the twisted-pair cable also transmits ground signals.

5. The system of claim 1, further comprising:
   a management device including a second serial console connector;
   a second twisted-pair cable connector on the twisted pair cable; and
   a second twisted-pair cable serial console communication adapter device that is connected to the second serial console connector and the second twisted-pair cable connector, wherein the second twisted-pair cable serial console communication adapter device is configured to:
      receive the second signals via a second transmit pin on the second serial console connector;
      provide the second signals to the second twisted-pair conductor in the twisted-pair cable;
      receive the first signals via the first twisted-pair conductor in the twisted-pair cable; and provide the first signals to a second receive pin on the second serial console connector.

6. The system of claim 5, wherein the twisted-pair cable is an Ethernet cable and the second twisted-pair cable connector is a cable Ethernet RJ-45 connector.

7. The system of claim 6, wherein the second twisted-pair cable serial console communication adapter device includes an adapter serial console RJ-45 connector connected to the second serial console connector, and an adapter Ethernet RJ-45 connector connected to the cable Ethernet RJ-45 connector provided by the second twisted-pair cable connector.

8. The system of claim 5, wherein the second twisted-pair conductor in the twisted-pair cable also transmits ground signals.

9. A twisted-pair cable serial console communication adapter device, comprising:
a chassis;
a serial console connector that is included on the chassis;
a twisted-pair connector that is included on the chassis and that is configured to connect to a twisted-pair cable; and
a signal routing subsystem that is coupled to the serial console connector and the twisted-pair connector, wherein the signal routing subsystem is configured to:
receive first signals via a transmit pin on the serial console connector;
provide the first signals to a first twisted-pair conductor connector pin in the twisted-pair connector that is configured to connect to a first twisted-pair conductor in the twisted-pair cable when the twisted pair cable is connected to the twisted-pair connector;
receive second signals via a second twisted-pair conductor connector pin in the twisted pair connector that is configured to connect to a second twisted-pair conductor in the twisted-pair cable when the twisted pair cable is connected to the twisted-pair connector; and
provide the second signals to a receive pin on the serial console connector.

10. The IHS of claim 9, wherein the twisted-pair cable is an Ethernet cable.

11. The IHS of claim 10, wherein the serial console connector is an adapter serial console RJ-45 connector, and the twisted-pair connector is an adapter Ethernet RJ-45 connector.

12. The IHS of claim 7, wherein the first twisted-pair conductor in the twisted-pair cable also transmits ground signals.

13. The IHS of claim 7, wherein the second twisted-pair conductor in the twisted-pair cable also transmits ground signals.

14. A method for providing serial console communications, comprising:
receiving, by a first twisted-pair cable serial console communication adapter device, first signals via a first transmit pin on a first serial console connector that is included on a networking device and connected to the first twisted-pair cable serial console communication adapter device;
providing, by the first twisted-pair cable serial console communication adapter device, the first signals to a first twisted-pair conductor in a twisted-pair cable that is connected to the first twisted-pair cable serial console communication adapter device;
receiving, by the first twisted-pair cable serial console communication adapter device, second signals via a second twisted-pair conductor in the twisted-pair cable; and
providing, by the first twisted-pair cable serial console communication adapter device, the second signals to a first receive pin on the first serial console connector.

15. The method of claim 14, wherein the twisted-pair cable is an Ethernet cable.

16. The method of claim 15, wherein the first twisted-pair cable serial console communication adapter device includes an adapter serial console RJ-45 connector connected to the first serial console connector, and an adapter Ethernet RJ-45 connector connected to the Ethernet cable provided by the twisted-pair cable.

17. The method of claim 14, wherein the first twisted-pair conductor in the twisted-pair cable also transmits ground signals.

18. The method of claim 14, further comprising:
receiving, by a second twisted-pair cable serial console communication adapter device, the second signals via a second transmit pin on a second serial console connector that is included on a management device and connected to the second twisted-pair cable serial console communication adapter device;
providing, by the second twisted-pair cable serial console communication adapter device, the second signals to the second twisted-pair conductor in the twisted-pair cable that is connected to the second twisted-pair cable serial console communication adapter device;
receiving, by the second twisted-pair cable serial console communication adapter device, the first signals via the first twisted-pair conductor in the twisted-pair cable; and
providing, by the second twisted-pair cable serial console communication adapter device, the first signals to a second receive pin on the second serial console connector.

19. The method of claim 14, wherein the second twisted-pair cable serial console communication adapter device includes an adapter serial console RJ-45 connector connected to the second serial console connector, and an adapter Ethernet RJ-45 connector connected to the twisted-pair cable.

20. The method of claim 18, wherein the second twisted-pair conductor in the twisted-pair cable also transmits ground signals.

* * * * *